Patented Mar. 6, 1928.

1,661,512

UNITED STATES PATENT OFFICE.

FRANCIS DALY SULLIVAN, OF MEMPHIS, TENNESSEE.

OIL-WELL-CLEANING COMPOSITION.

No Drawing.     Application filed July 23, 1924.   Serial No. 727,718.

This invention relates to a composition for cleaning oil wells.

An object of this invention resides in providing a method for cleaning oil wells which consists in preparing a composition having heat generating properties in contact with water, oil or the like, and conveying and discharging a quantity of said composition to the bottom of a well and releasing it for contact with oil and water in said well for generating heat in the well and generating a gas for dissolving, melting and cleaning substances in said well clogging the flow therethrough.

Another object of the invention resides in providing a well cleaning composition having heat and gas generating properties in contact with water and oil, particularly adapted for use in oil wells for melting and dissolving paraffin and asphaltum and carrying the same in solution to the top of the well.

A further object of the invention resides in providing an oil well cleaning composition wherein caustic soda or barium oxide and aluminum powder or filings form the principal ingredients of the composition and which are adapted for creating a large amount of heat and gas in contact with water and oil adapted to react thereon for removing paraffin and asphaltum from the casing of the well.

A still further object of the invention resides in providing a composition for cleaning oil wells having heat, gas and foam generating properties in contact with water and oil adapting it for use in oil wells for melting and dissolving paraffin and asphaltum and carrying the same in solution to the top of the well.

The invention also includes other objects and improvements in the manner of carrying out the method, and preparation of the composition which are more particularly pointed out in the following detailed description and claims, directed to a preferred method and composition, it being understood however that various changes may be made therein without departing from the spirit and scope of this invention as described and claimed.

It has been found from practical experiment that caustic soda and aluminum filings or powder or barium oxide and aluminum filings intermesh when brought into contact with water and oil such as found in oil wells that an acid reaction will take place generating a great heat and forming a gas that will create a further heat and generate pressure in the presence of the oil and water. A small proportion of these substances in comparison with the well will generate sufficient heat to melt paraffin and asphaltum and dissolve the same from the sides of the well and the well casing to form a resultant solution of the two which will rise to the top of the well and may be conveniently pumped off. It is preferred however to use caustic soda in view of the fact that it is more soluble than barium oxide, but it is to be understood that either, or a mixture of both are adapted for use in carrying out the method in making the composition according to this invention. A mixture of from five to seventy-five per cent of aluminum filings and ninety-five to twenty-five per cent of caustic soda or barium oxide is found to produce the desired result in an efficient manner, and if desired any proportion of a mixture of caustic soda and barium oxide may be used with the above percentages of aluminum filings.

Under some conditions it is found desirable to inter-mix with the composition of aluminum filings, caustic soda or barium oxide, about 3% of sodium bicarbonate and about 3% of citric acid to give an effervescent effect during the heat and gas generation in the well which will aid in the dissolving and cleaning of the desired substance from the well. It is also found desirable under certain conditions to add about 3% of soap powder or saponin or a mixture of both in order that a foamy action in combination with the gaseous action thereof will be generated in order to set up a thorough circulation of the material in the well for distributing the heat and also affecting a cleaning action on the sides of the well and casing. This foamy action results from the use of soap powder or saponin by the gaseous eruption between the aluminum filings and caustic soda and, or barium oxide in contact with the water.

The composition above described is packed in a suitable container ready for use in an oil well and while it may be dumped into the top of the well or applied in any other suitable manner, it is found most desirable to place the container in a suitable carrier and convey the composition to the bottom of the well where the container is opened in any suitable manner to permit the contact and intermingling of the solution with the oil and water in the well. This would generate a great heat at the bottom of the well which will pass upwardly due to the gaseous action and the foamy and effervescent effect generated by the several substances of the composition. It is found that this composition mixed with water will liberate heat amounting to approximately 368.6 calories per gram, or approximately 663.5 B. t. u. per pound. The foam generated by the reaction will rise through the well and with the cleaning and dissolving action of the heat, gas and ingredients of the composition will clean the sides of the well and carry all paraffin and asphaltum which normally clogs the pipes and casing and the fissures in the well and prevents the flow therein to the top of the well in solution, after which it may be subsequently pumped off in a convenient manner and the well restored to normal and efficient operation.

Having thus described the invention, what I claim is:—

1. An oil well cleaning composition comprising caustic soda, aluminum powder, sodium bicarbonate, soap powder, saponin, and citric acid.

2. An oil well cleaning composition comprising caustic soda, barium oxide, aluminum powder, soduim bicarbonate, soap powder, saponin, and citric acid.

3. An oil well cleaning composition consisting of as its principal constituents caustic soda, aluminum powder, sodium bicarbonate and citric acid.

4. An oil well cleaning composition consisting of as its principal constituents caustic soda, aluminum powder, sodium bicarbonate, citric acid and soap powder.

5. An oil well cleaning composition consisting of as its principal constituents caustic soda, aluminum powder, sodium bicarbonate, citric acid, and a saponaceous agent.

In testimony whereof I affix my signature.

FRANCIS DALY SULLIVAN.